United States Patent
Nagayoshi

(10) Patent No.: US 9,576,222 B2
(45) Date of Patent: Feb. 21, 2017

(54) IMAGE RETRIEVAL APPARATUS, IMAGE RETRIEVAL METHOD, AND RECORDING MEDIUM

(71) Applicant: Hitachi Kokusai Electric Inc., Chiyoda-ku, Tokyo (JP)

(72) Inventor: Hiroto Nagayoshi, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 14/780,638

(22) PCT Filed: Jan. 29, 2014

(86) PCT No.: PCT/JP2014/051937
§ 371 (c)(1),
(2) Date: Sep. 28, 2015

(87) PCT Pub. No.: WO2014/167880
PCT Pub. Date: Oct. 16, 2014

(65) Prior Publication Data
US 2016/0078314 A1 Mar. 17, 2016

(30) Foreign Application Priority Data
Apr. 9, 2013 (JP) ................... 2013-081088

(51) Int. Cl.
*G06K 9/00* (2006.01)
*G06K 9/62* (2006.01)
(Continued)

(52) U.S. Cl.
CPC ....... *G06K 9/6211* (2013.01); *G06F 17/30256* (2013.01); *G06K 9/78* (2013.01); *G06T 11/00* (2013.01)

(58) Field of Classification Search
CPC .............................. G01N 21/718; G01J 3/443
See application file for complete search history.

(56) References Cited

U.S. PATENT DOCUMENTS

| 6,301,577 B1 | 10/2001 | Matsumoto et al. |
| 2004/0017932 A1 | 1/2004 | Yang |

(Continued)

FOREIGN PATENT DOCUMENTS

| JP | 2001-160067 A | 6/2001 |
| JP | 2005-512201 A | 4/2005 |

(Continued)

OTHER PUBLICATIONS

M.A. Turk et al., "Face Recognition Using Eigenfaces," Vision and Modeling Group, The Media Laboratory Massachusetts Institute of Technology, 1991 IEEE, pp. 586-591.
(Continued)

*Primary Examiner* — Oneal R Mistry
(74) *Attorney, Agent, or Firm* — Crowell & Moring LLP

(57) ABSTRACT

An image retrieval apparatus comprises: a memory unit that stores image feature values; an acquisition unit that acquires a first image feature value for a retrieval target image; a retrieval unit that retrieves an image feature value that is similar to the first image feature value from the image feature values, based on the first image feature value; a determining unit that determines a linear conversion parameter to be used for linear conversion out of a group of linear conversion parameters based on image feature values for images of the same photographic subject obtained under conditions, based on the first image feature value and image feature values for said photographic subject; a conversion unit that converts the first image feature value by the linear conversion parameter, and converts the image feature value using said linear conversion parameter; and an output unit that outputs the conversion results.

6 Claims, 15 Drawing Sheets

(51) Int. Cl.
*G06F 17/30* (2006.01)
*G06T 11/00* (2006.01)
*G06K 9/78* (2006.01)

(56) References Cited

U.S. PATENT DOCUMENTS

| | | |
|---|---|---|
| 2005/0201595 A1 | 9/2005 | Kamei |
| 2008/0082506 A1 | 4/2008 | Saito et al. |
| 2008/0273766 A1* | 11/2008 | Kim .................. G06K 9/00295 382/118 |
| 2008/0304750 A1 | 12/2008 | Kamei |
| 2010/0017389 A1* | 1/2010 | Ogunbona ............ G06K 9/627 707/E17.03 |
| 2010/0290708 A1* | 11/2010 | Magai .................. G06K 9/6211 382/195 |
| 2012/0208974 A1* | 8/2012 | Sambasivam .......... C09J 133/08 526/264 |
| 2014/0201219 A1* | 7/2014 | Kim .................. G06F 17/30247 707/749 |

FOREIGN PATENT DOCUMENTS

| | | |
|---|---|---|
| JP | 2008-90612 A | 4/2008 |
| JP | 2009-140513 A | 6/2009 |
| WO | WO 03/049033 A1 | 6/2003 |

OTHER PUBLICATIONS

Z. Li et al., "Nonparametric Discriminant Analysis for Face Recognition," IEEE Transactions on Pattern Analysis and Machine Intelligence, vol. 31, No. 4 (Apr. 2009), pp. 755-761.

International Search Report (PCT/ISA/210) issued in PCT Application No. PCT/JP2014/051937 dated Mar. 25, 2014 with English-language translation (five (5) pages).

Written Opinion (PCT/ISA/237) issued in PCT Application No. PCT/JP2014/051937 dated Mar. 25, 2014 with English-language translation (six (6) pages).

* cited by examiner

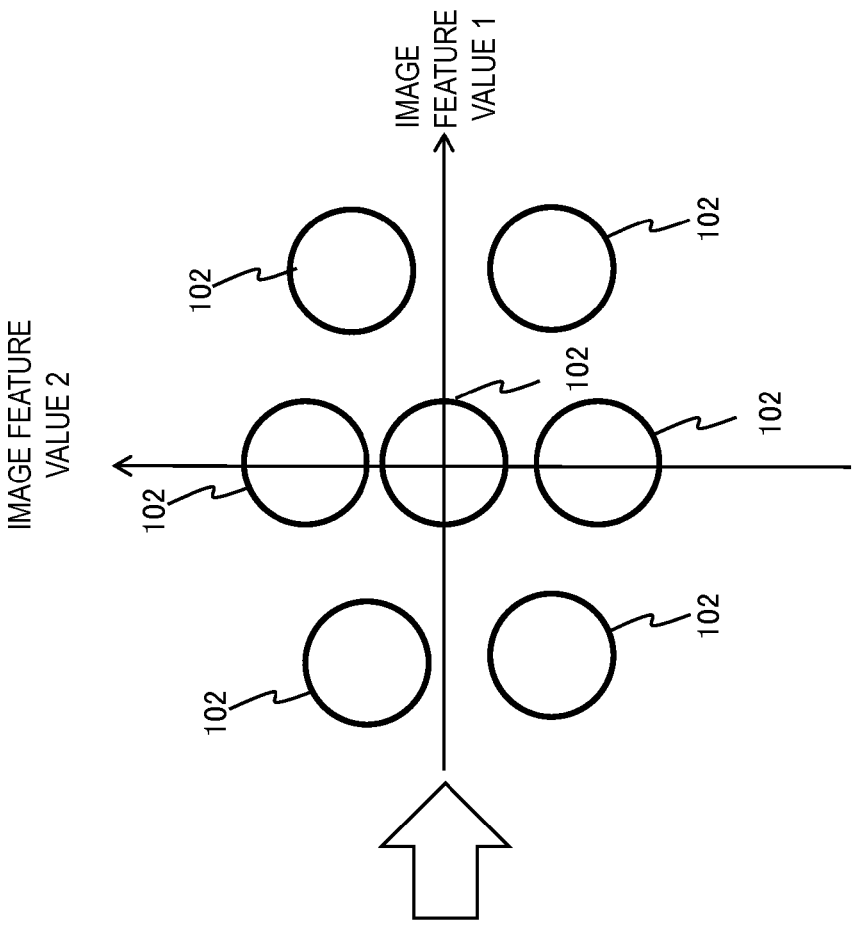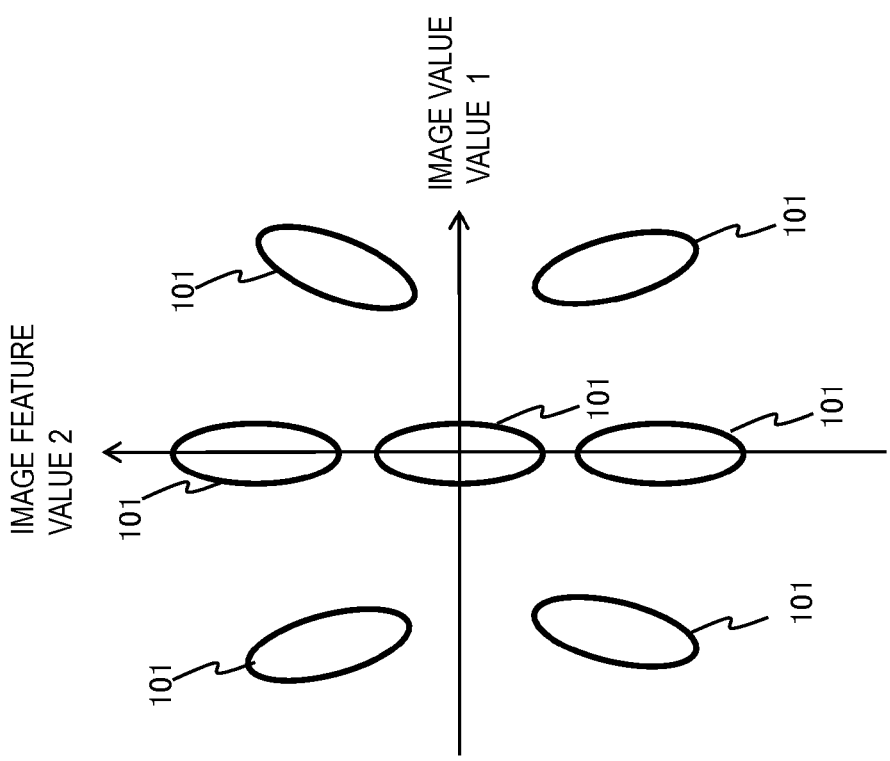

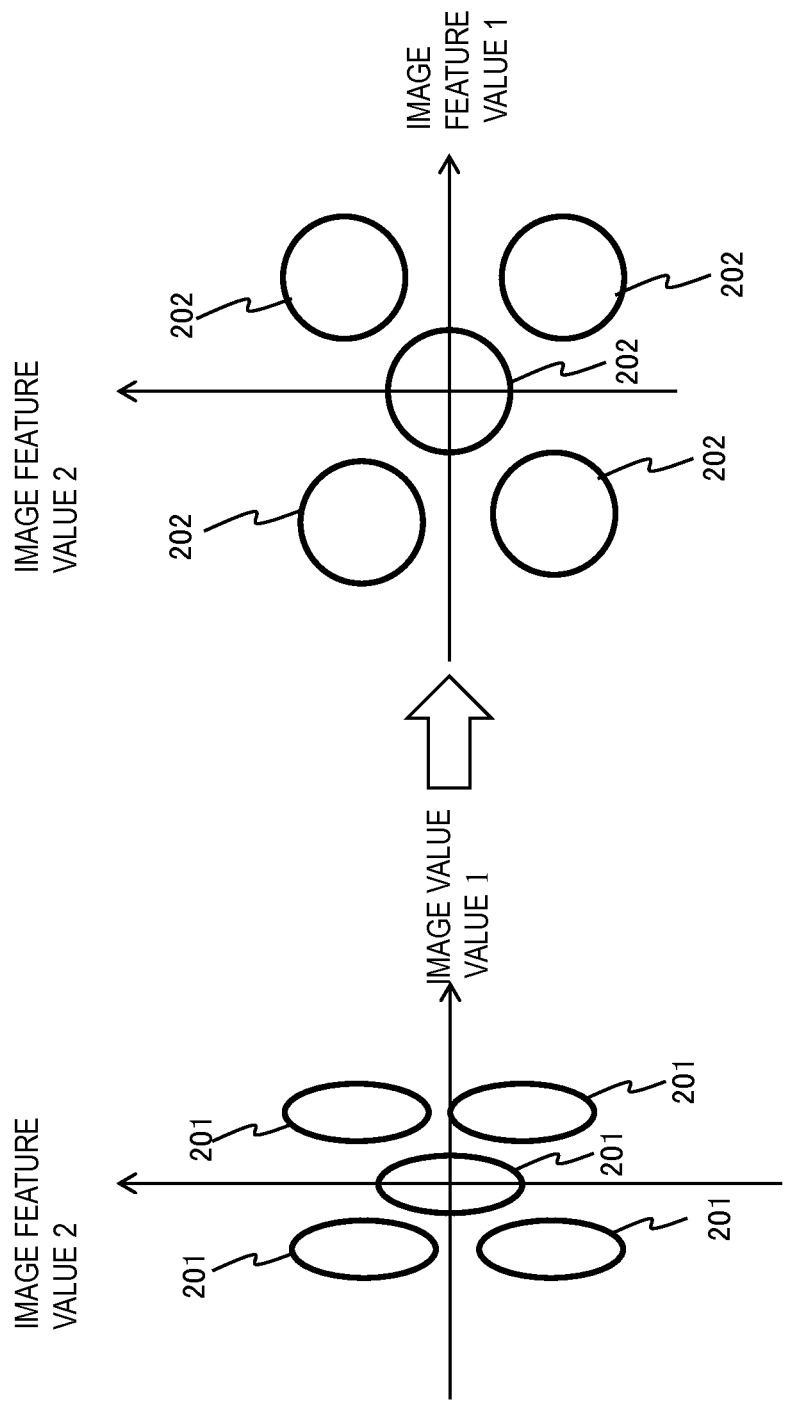

IMAGE RETRIEVAL APPARATUS, IMAGE RETRIEVAL METHOD, AND RECORDING MEDIUM

CLAIM OF PRIORITY

The present application claims priority from Japanese patent application JP 2013-081088 filed on Apr. 9, 2013, the content of which is hereby incorporated by reference into this application.

BACKGROUND ARTS

The present invention relates to an image retrieval apparatus that retrieves an image, an image retrieval method, and a recording medium.

A plurality of images of the same photographic subject with taken from different directions or under different illumination conditions have image feature values differing from each other. Such variations in image feature value arise from the shape of the photographic subject, and therefore differ among respective photographic subjects. In other words, if approximated with the Gaussian distribution, the major axis varies depending on the photographic subject. When a partial vector space that is less likely to be affected by the variations in major axis direction, which is caused by a difference in photographic subject, is to be extracted, it is necessary to extract a partial space with a distribution that is as isotropic as possible by correcting the variations in major axis among different photographic subjects.

In the facial recognition system and method disclosed in JP 2005-512201 A, a pair of an input facial image and a reference facial image is projected from an input space to a higher dimension feature space, thereby obtaining more typical features of the facial image. A kernel-based Fisher face of the input facial image and the reference facial image is calculated. The input facial image and the reference facial image are indicated as points in the facial image space, and using the distance between the point of the inputted face and the point of each reference facial image, the resemblance of the input facial image to a specific facial image of the reference facial image is determined.

JP 2005-512201 A described above, however, uses non-linear conversion, and therefore has a problem of taking a long time to process. When obtained images are saved in a database in succession, for example, because non-linear conversion is conducted every time, it takes a long time to register the images, which limits the number of registration per unit time. Also, when non-linear conversion is conducted on the obtained images, image feature values, which are used to indicate the degree of similarity between images, cannot be obtained.

SUMMARY OF THE INVENTION

The present invention aims at reducing the time required for a process to convert image feature values.

An aspect of the invention disclosed in this application is an image retrieval apparatus that retrieves an image, an image retrieval method, and a recording medium, comprising: a memory unit configured to store therein a plurality of image feature values; an acquisition unit configured to acquire a first image feature value for a retrieval target image; a retrieval unit configured to retrieve an image feature value that is similar to the first image feature value from the plurality of image feature values stored in the memory unit, based on the first image feature value acquired by the acquisition unit; a determining unit configured to determine a linear conversion parameter to be used for linear conversion out of a group of linear conversion parameters that are based on a plurality of image feature values for a plurality of images of a photographic subject obtained for the same photographic subject under a plurality of conditions, based on the first image feature value and image feature values for said photographic subject; a conversion unit configured to convert the first image feature value by the linear conversion parameter determined by the determining unit, the conversion unit converting the image feature value retrieved by the retrieval unit using said linear conversion parameter; and an output unit configured to output conversion results of the conversion unit.

According to representative embodiments of the present invention, it is possible to reduce the timer required for a process to convert image feature values. Other objects, configurations, and effects than those described above are clarified by the following description of an embodiment.

BRIEF DESCRIPTION OF THE DRAWINGS

FIGS. 1A and 1B are diagrams 1 for explaining a feature value space.

FIGS. 2A and 2B are diagrams 2 for explaining a feature value space.

DETAILED DESCRIPTIONS OF EMBODIMENTS

Figure 3:
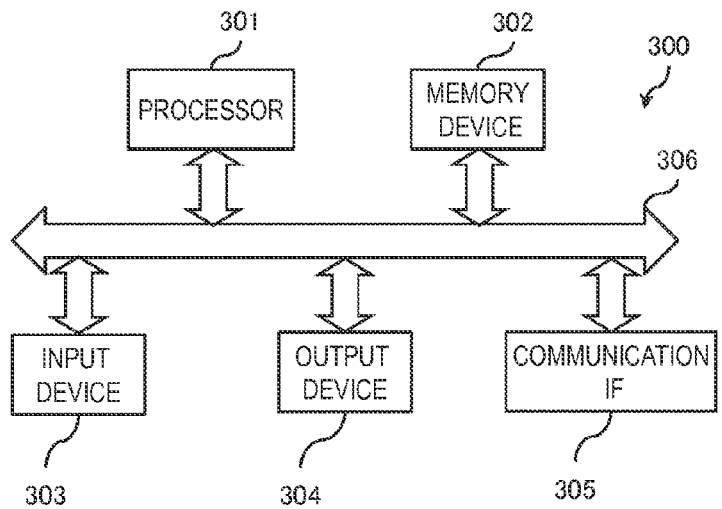
FIG. 3 is a block diagram showing a hardware configuration example of an image retrieval apparatus.

The conversion process for the image feature value of the present invention is a conversion process that uses linear conversion but still achieves the substantially same level of accuracy as that of non-linear conversion. The present invention will be explained below with reference to figures.

FIGS. 1A and 1B are diagrams 1 for explaining a feature value space. Although an image has a plurality of types of image feature value, in this example, distributions of two types of image feature value (image feature value 1 and image feature value 2) will be explained to simplify the explanation. The image feature value is typically represented as a numeric vector. The respective elements of the numeric vector include numeric values representing colors of the image, values of the gradient strength and direction of image, and values of frequency distribution calculated based on those values. The closer the image feature values are, the more similar respective images are to each other. The Euclidean distance, Mahalanobis distance, or Bhattacharyya distance are used as an indicator to evaluate similarity, for example. The smaller the distance is, the more similar respective images are to each other.

FIG. 1A is a feature value space where the feature value distributions before conversion are present, and FIG. 1B is a feature value space where the feature value distributions after conversion are present. In FIG. 1A, variations in facial images of each individual is schematically shown with feature value distributions 101 each having an oval shape that is defined by the image feature value 1 and the image feature value 2. The respective feature value distributions 101 of the image feature values that are located at different locations in the vector space of the image feature value indicate variations in faces of different individuals. The directions with a greater degree of variations (major axis of the ellipse in this example) differ among individuals as each person has different facial features.

The object is to obtain the isotropic feature value distributions 102 shown in FIG. 1B by converting the feature value distributions 101. Because the feature value distributions 102 are each isotropic, the degree of similarity between two objects can be represented with ease using the Euclidean distance.

Converting FIG. 1A to FIG. 1B involves non-isotropic conversion at different locations in the feature value space. That is, non-linear conversion is necessary. However, because non-linear conversion requires many parameters, it takes a long time to complete the non-linear conversion process, which reduces the conversion speed or the retrieval speed.

FIGS. 2A and 2B are diagrams 2 for explaining a feature value space. Unlike FIGS. 1A and 1B, FIGS. 2A and 2B focus on a localized area. In this localized area, images that have similar image feature values are located close to each other. In the case of facial image, for example, it is known that if the feature values obtained from two-dimensional facial images are similar to each other, generally, the three-dimensional structures of respective faces are also similar to each other. This means that the distributions due to the face orientation and illumination conditions are also similar. That is, the feature value distributions 201 have variations in the same direction as shown in FIG. 2A. Thus, the feature value distributions 201 of FIG. 2A can be converted into the isotropic feature value distributions 202 of FIG. 2B using linear-conversion.

The conversion process compiles a database of linear conversion parameters based on image feature values that have variations in the same direction as in the feature value distributions 201 of FIG. 2A, and selects from the database of the linear conversion parameters, a linear conversion parameter that is most suited to the retrieval target image. As described above, adopting the linear conversion allows the conversion process for the image feature values to complete faster while maintaining substantially the same level of accuracy as that of non-linear conversion.

FIG. 3 is a block diagram showing a hardware configuration example of an image retrieval apparatus. The image retrieval apparatus 300 includes a processor 301, a memory device 302, an input device 303, an output device 304, and a communication interface (communication IF) 305. The processor 301, memory device 302, input device 303, output device 304, and communication IF 305 are connected to each other via bus. The processor 301 controls the image retrieval apparatus 300. The memory device 302 is used as a work area of the processor 301. The memory device 302 also stores therein various types of programs and data. Examples of the memory device 302 include ROM (read only memory), RAM (random access memory), HDD (hard disk drive), and flash memory. The input device 303 is provided to input data. Examples of the input device 303 include a keyboard, mouse, touch panel, numerical keys, and scanner. The output device 304 is provided to output data. Examples of the output device 304 include a display and printer. The communication IF 305 is connected to network for data exchange. Embodiments of the present invention will be explained below.

Embodiment 1

Database

Figure 4:
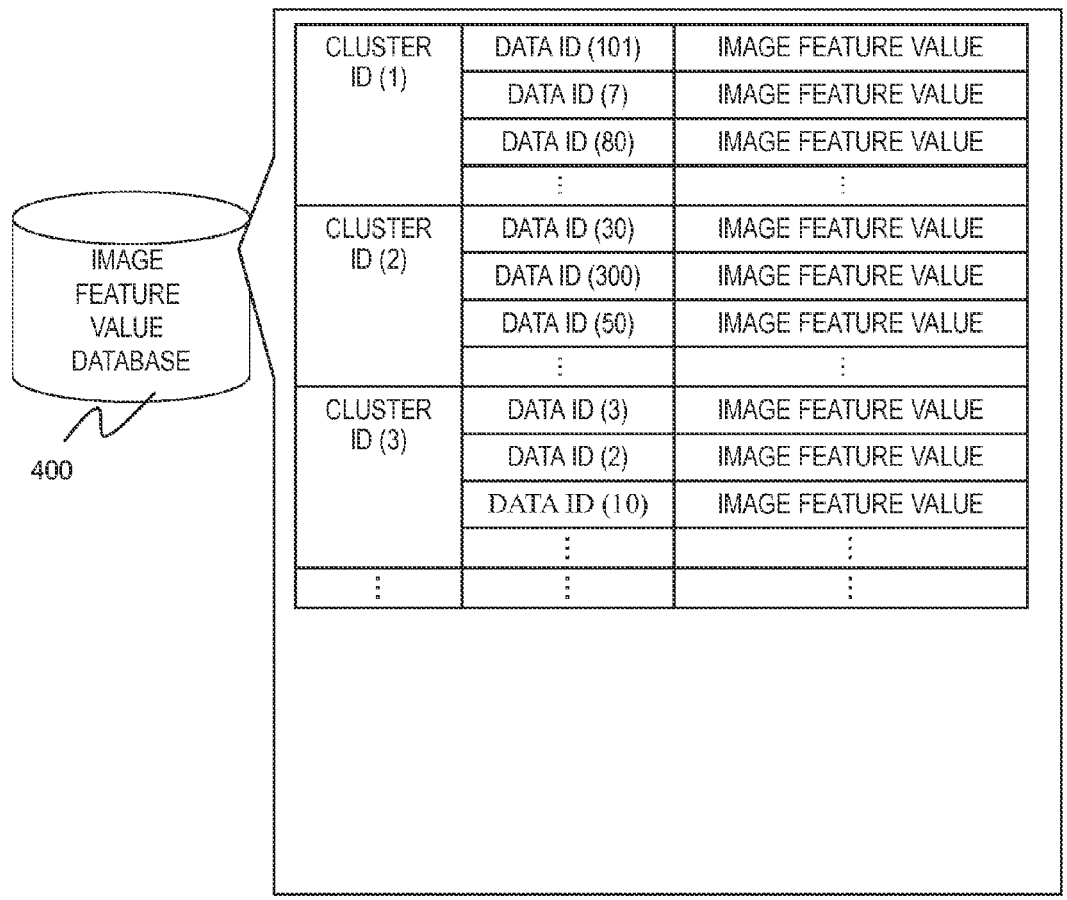
FIG. 4 is a diagram for explaining an example of the content of image feature value database of Embodiment 1.

FIG. 4 is a diagram for explaining an example of the content of image feature value database of Embodiment 1. The image feature value database 400 stores data IDs and image feature values for the respective data IDs for each cluster ID. The cluster ID is identification information that specifies a cluster. The cluster is a group of data containing data IDs having image feature values that are similar to each other. The data ID is identification information that specifies data. Data is an image, for example. Each image, i.e., data, is stored in the memory device 302. The image feature value is a numeric vector that indicates the features of an image, i.e., data, as described above. Thus, the image feature values within the same cluster are similar to each other.

Figure 5:
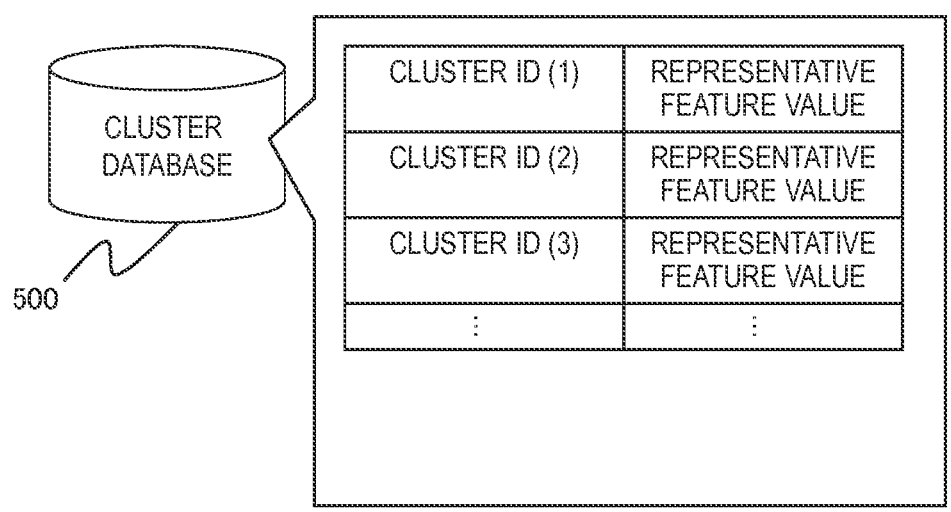
FIG. 5 is a diagram for explaining an example of the content of cluster database of Embodiment 1.

FIG. 5 is a diagram for explaining an example of the content of cluster database of Embodiment 1. The cluster database 500 saves the cluster IDs shown in FIG. 4 in association with respective representative feature values. The representative feature value is the image feature value that represents a group of image feature values in a cluster of each cluster ID. The representative feature value, for example, is an image feature value that is the average of respective vector elements of the group of image feature values in a cluster that underwent linear conversion using a first linear conversion parameter, which will be explained below. Upon image retrieval, the image feature value database 400 shown in FIG. 4 can be directly accessed, but retrieving an image using a representative feature value in the cluster database 500 makes it possible to narrow down to specific clusters. This results in improvement of the retrieval speed.

Figure 6:
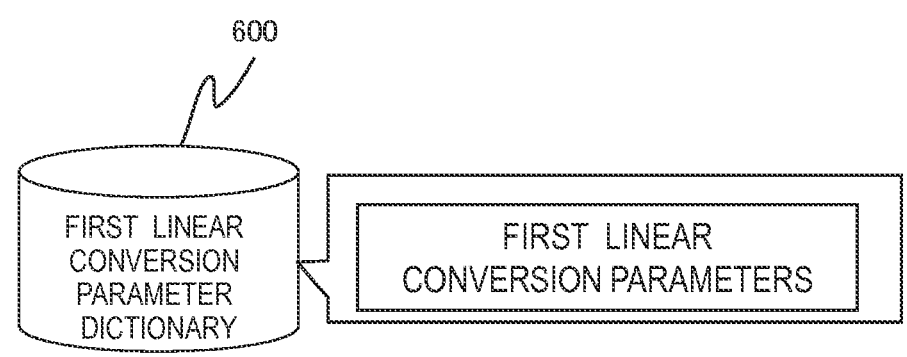
FIG. 6 is a diagram for explaining the content stored in a first linear conversion parameter dictionary of Embodiment 1.

FIG. 6 is a diagram for explaining the content stored in a first linear conversion parameter dictionary of Embodiment 1. The first linear conversion parameter dictionary 600 stores therein the first linear conversion parameters. The first linear conversion parameters are matrices obtained as a result of known statistical analysis such as principal components analysis or discriminant analysis. If the first linear conversion parameters are matrices obtained through the main components analysis, it is possible to reduce dimensions of image feature values, which have several-thousand dimensions in some cases, to allow for high-speed retrieval. If the first linear conversion parameters are matrices obtained through the discriminant analysis, it is possible to differentiate individuals from each other with greater ease in the image feature values after the conversion.

Figure 7:
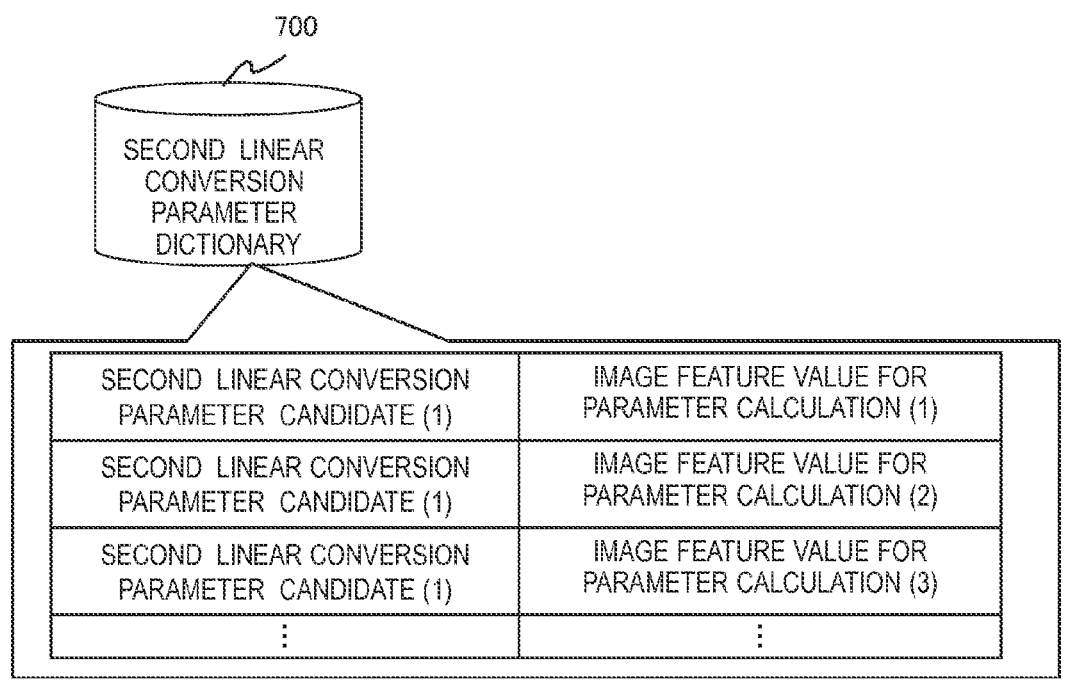
FIG. 7 is a diagram for explaining the content stored in a second linear conversion parameter dictionary of Embodiment 1.

FIG. 7 is a diagram for explaining the content stored in a second linear conversion parameter dictionary of Embodiment 1. The second linear conversion parameter dictionary 700 stores candidates of the second linear conversion parameters and image feature values to be used to calculate parameters in association with each other. The candidates of the second linear conversion parameters are linear conversion parameter candidates that are used for the linear conversion shown in FIGS. 2A and 2B. The candidates of the second linear conversion parameters are obtained by the respective methods described below. In the descriptions below, facial images of humans are used as an example, but those methods may also apply to other living things or objects such as cars.

The first method will be explained. First, a variance-covariance matrix can be obtained from image feature values for a plurality of facial images of person "i" that include variations resulting from the differences in orientations and illumination conditions. The variance-covariance matrix of person "i" is defined as $\Sigma_i$, and the eigenvalue problem of the following formula (1) is solved, thereby obtaining the eigenvalue $\lambda$ and eigenvector e for the variance-covariance matrix $\Sigma_i$ of person "i."

$$\Sigma_i x = \lambda x \qquad (1)$$

Then as shown in the following formula (2), a conversion matrix $A_i$ can be obtained, in which the resultant eigenvalues $\lambda$ and eigenvectors e for the eigenvalues $\lambda$ are arranged in descending order up to the N-th value.

$$A_i = \begin{bmatrix} \lambda_1^{-1/2} e_1 \\ \lambda_2^{-1/2} e_2 \\ \vdots \\ \lambda_N^{-1/2} e_N \end{bmatrix} \qquad (2)$$

The formula (2) normalizes the weight of each axis in the main components analysis by the standard deviation of data on the axis.

The second method will be explained. First, the intra-class variance-covariance matrix $\Sigma_{W,i}$, and the inter-class variance-covariance matrix $\Sigma_{B,i}$ are obtained based on the average of the plurality of image feature values obtained from the plurality of facial images of person "i" and image feature values of a group of images of person "j" that are within a prescribed distance from the average of the plurality of the image feature values. Each person makes up one class. The eigenvalue problem of the following formula (3) is solved, thereby obtaining eigenvalues $\lambda$ and eigenvectors e.

$$\Sigma_{B,i} x = \lambda \Sigma_{W,i} x \qquad (3)$$

Then as shown in the following formula (4), a conversion matrix $A_i$ can be obtained, in which the eigenvectors e are arranged up to the N-th value in descending order of the eigenvalues that correspond to the respective eigenvectors.

$$A_i = \begin{bmatrix} e_1 \\ e_2 \\ \vdots \\ e_N \end{bmatrix} \qquad (4)$$

The second method is a method of linear discrimination. When there are an adequate number of person groups "k," the linear discrimination method is more preferable than the main component analysis method.

The third method will be explained. First, the intra-class variance-covariance matrix $\Sigma_{W,i}$ is obtained based on the average of the plurality of image feature values obtained from the plurality of facial images of person "i" and image feature values of a group of images of person "j" that are within a prescribed distance from the average of the plurality of the image feature values. Each person makes up one class. The eigenvalue problem of the following formula (5) is solved, thereby obtaining eigenvalues $\lambda$ and eigenvectors e.

$$\Sigma_{B,i} x = \lambda x \qquad (5)$$

Then as shown in the following formula (6), a conversion matrix $A_i$ can be obtained, in which the eigenvectors e are arranged up to the N-th value in descending order of the eigenvalues.

$$A_i = \begin{bmatrix} \lambda_1^{-1/2} e_1 \\ \lambda_2^{-1/2} e_2 \\ \vdots \\ \lambda_N^{-1/2} e_N \end{bmatrix} \qquad (6)$$

The conversion matrix $A_i$ obtained through one of the first to third methods described above is a candidate of the second linear conversion parameter for a person "i."

In FIG. 7, the image feature values for parameter calculation is an image feature value that corresponds to each second linear conversion parameter candidate. For example, the respective image feature values for parameter calculation that correspond to the second linear conversion parameter candidates of a person "i" is image feature values that were obtained by conducting linear conversion on the respective image feature values for a plurality of images of the person "i" using the first linear conversion parameter, and by averaging the respective image feature values that underwent the linear conversion.

The respective databases 400 to 700 shown in FIGS. 4 to 7 are stored in the memory device 302 shown in FIG. 3. Data in each database 400 to 700 may be obtained through the communication IF 305. The same applies to images that correspond to data IDs.

<Functional Configuration Example of Image Retrieval Apparatus 300>

Figure 8:
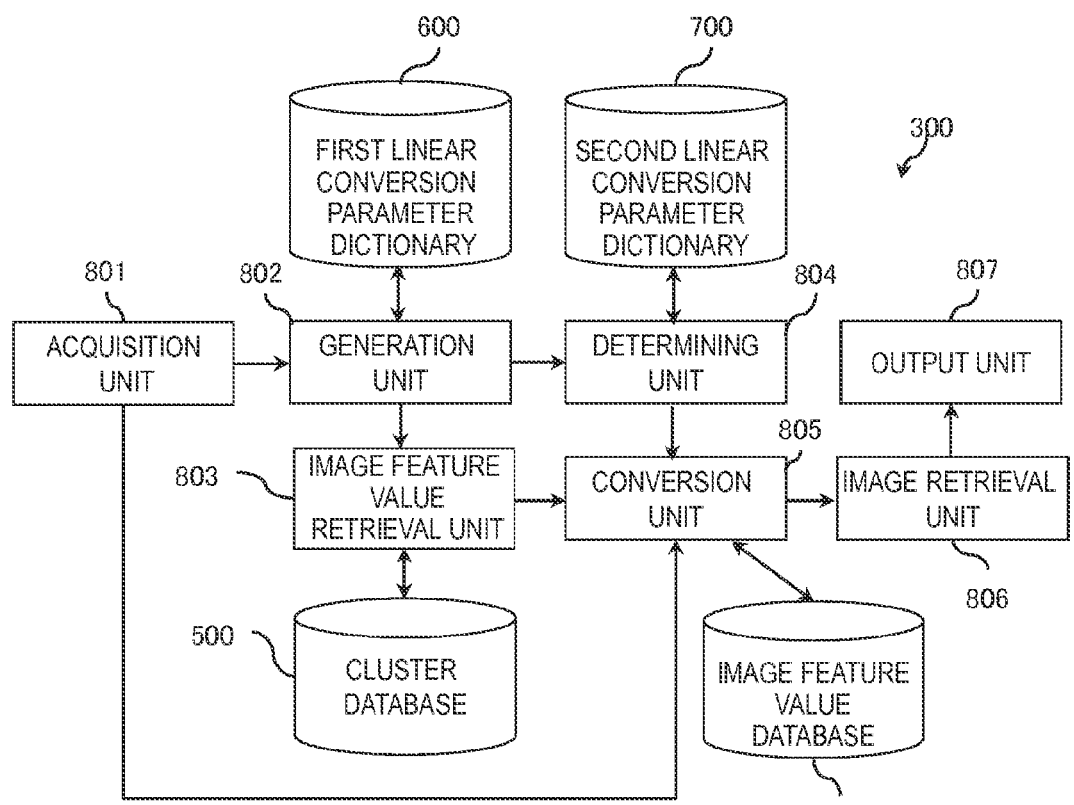
FIG. 8 is a block diagram showing a functional configuration example of the image retrieval apparatus of Embodiment 1.

FIG. 8 is a block diagram showing a functional configuration example of the image retrieval apparatus 300 of Embodiment 1. The image retrieval apparatus 300 includes the image feature value database 400, the cluster database 500, the first linear conversion parameter dictionary 600, the second linear conversion parameter dictionary 700, an acquisition unit 801, an generation unit 802, an image feature value retrieval unit 803, a determining unit 804, a conversion unit 805, an image retrieval unit 806, and an output unit 807. The specific functions of the acquisition unit 801 to output unit 807 are realized by having the processor 301 shown in FIG. 3 execute programs, for example.

The acquisition unit 801 acquires image feature values for the retrieval target image. When the acquisition unit 801 obtains the retrieval target image, the acquisition unit 801 calculates image feature values of the retrieval target image. As described above, the image feature values are represented as numeric vectors. The respective elements of the numeric vector include numeric values representing colors of the image, values of the gradient strength and direction of image, and values of frequency distribution calculated based on those values. The acquisition unit 801 may also be configured to obtain calculated image feature values for the retrieval target image.

The generation unit 802 converts the image feature values for the retrieval target image, which have been acquired by the acquisition unit 801, using the first linear conversion parameter in the first linear conversion parameter dictionary 600, thereby generating image feature values of the retrieval target image that were subjected to the linear conversion. This way, if the first linear conversion parameter is a matrix for the main components analysis, it is possible to reduce the dimensions of the image feature values of the retrieval target image, which in some cases have several-thousand dimensions, to fit high-speed retrieval. If the first linear conversion parameter is a matrix for the discriminant analysis, the image feature values of the retrieval target image are converted into image feature values that allow respective individuals to be differentiated from each other with ease. The conversion using the first linear conversion parameter as described above will be referred to as the "first linear conversion."

The image feature value retrieval unit 803 retrieves an image feature value that specifies an image similar to the retrieval target image among the group of image feature values, based on the image feature values for the retrieval target image, which have been acquired by the acquisition unit 801. Specifically, the image feature value retrieval unit 803 retrieves an image feature value for an image that is similar to the retrieval target image among the group of image feature values, based on the post-conversion image feature value for the retrieval target, which has been generated by the generation unit 802, for example.

The image feature value retrieval unit 803 retrieves an image feature value that is similar to the image feature value for the retrieval target image based on the Euclidean distance, Mahalanobis distance, or Bhattacharyya distance between respective vectors, for example. The smaller the distance is, the more similar the images are to each other.

The group of image feature values is, when the cluster database 500 is not used, a group of image feature values stored in the image feature value database 400. When the cluster database 500 is used, the group of image feature values is a group of representative feature values stored in the cluster database 500. Using the cluster database 500 allows for a reduction in number of image feature values to be searched for, resulting in improvement of retrieval speed.

The determining unit 804 determines a linear conversion parameter to be used for linear conversion out of the group of linear conversion parameters that are based on a plurality of image feature values for a plurality of images of the same photographic subject obtained under a plurality of conditions, based on the image feature value for the retrieval target image and the image feature value for the photographic subject. The photographic subject is person "i" described above, for example. When the photographic subject is person "i," the plurality of conditions are different directions and different illumination conditions, for example. The group of linear conversion parameters is the second linear conversion parameter dictionary 700 described above.

The determining unit 804 selects a second linear conversion parameter that is applied to the linear conversion of the image feature value for the retrieval target image, among the second linear conversion parameter candidates, using the following formula (7), for example.

$$A = A_i \qquad (7)$$
$$i = \operatorname*{argmin}_i d(y_i, y_{in})$$

In this formula, $y_{in}$ is the image feature value of the retrieval target image after the first linear conversion, and $y_i$ is the image feature value for parameter calculation that corresponds to the second linear conversion parameter candidate for person "i." d (x, y) is the distance between x and y, which is the Euclidean distance, for example. The formula (7) defines, as the second linear parameter A, the second linear parameter candidate $A_i$ that corresponds to the image feature value for parameter calculation with which the distance "d" to the image feature value $y_{in}$ of the retrieval target image after the first linear conversion is smallest. If the resultant d ($y_i$, $y_{in}$) is greater than a prescribed threshold value, the linear conversion parameter might not be an appropriate parameter, and because this possibly lowers accuracy, the determining unit 804 outputs an alarm via the output unit 807.

The conversion unit 805 converts the image feature value for the retrieval target image using the linear conversion parameter determined by the determining unit 804. Specifically, the conversion unit 805 conducts the linear conversion on the image feature value for the retrieval target image, which is before the conversion that uses the first linear conversion parameter, using the second linear conversion parameter determined by the determining unit 804.

The conversion unit 805 also converts the image feature value retrieved by the image feature value retrieval unit 803, using the second linear conversion parameter. Specifically, because the representative feature value is retrieved by the image feature value retrieval unit 803 using the second linear conversion parameter determined by the determining unit 804, the conversion unit 805 identifies a cluster by referring to the cluster ID that corresponds to the retrieved representative feature value, and converts the respective image feature values in the identified cluster. The conversion using the second linear conversion parameter described above will be referred to as "second linear conversion."

The image retrieval unit 806 retrieves an image that is similar to the retrieval target image among a group of images from which the respective image feature values were extracted, based on the first conversion results that have been converted by the conversion unit 805 from the image feature values for the retrieval target image and the second conversion results converted by the conversion unit 805 from the image feature values retrieved by the retrieval unit 806. The first conversion results are the image feature values converted by the conversion unit 805 from the image feature values for the retrieval target image using the second linear conversion parameter. Similarly, the second conversion results are the image feature values converted by the conversion unit 805 from the respective image feature values in the cluster that corresponds to the representative feature value, using the second linear conversion parameter.

The image retrieval unit 806 retrieves image feature values that are similar to the first conversion results are searched for based on the Euclidean distance, Mahalanobis distance, or Bhattacharyya distance between respective vectors, for example. The smaller the distance is, the more similar the images are to each other.

The output unit 807 outputs the retrieval result of the image retrieval unit 806. The output unit 807 may also output the alert from the determining unit 804 as described above. The output unit 807 may output the information through an output device 304, which is a display or printer, or the output unit 807 may output the information to an external device through the communication IF 305. The output unit 807 may also store the information in the memory device 302.

Figure 9:
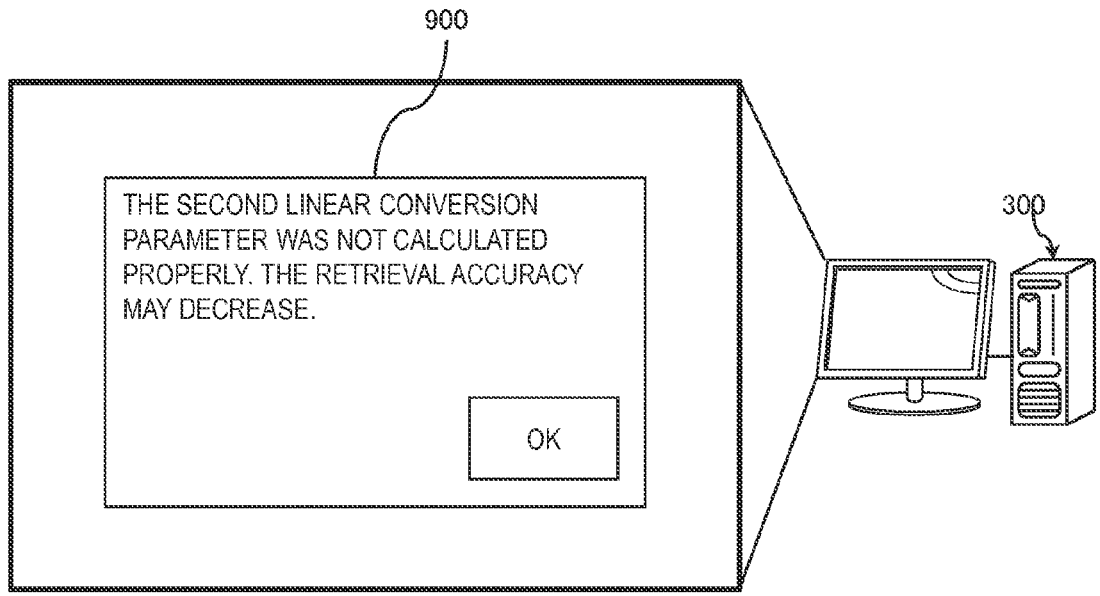
FIG. 9 is a diagram for explaining an example of the alert given by the determining unit of Embodiment 1.

FIG. 9 is a diagram for explaining an example of the alert given by the determining unit 804 of Embodiment 1. In FIG. 9, an alert screen 900 is shown in a display.

<Image Retrieval Processing Procedure>

Figure 10:
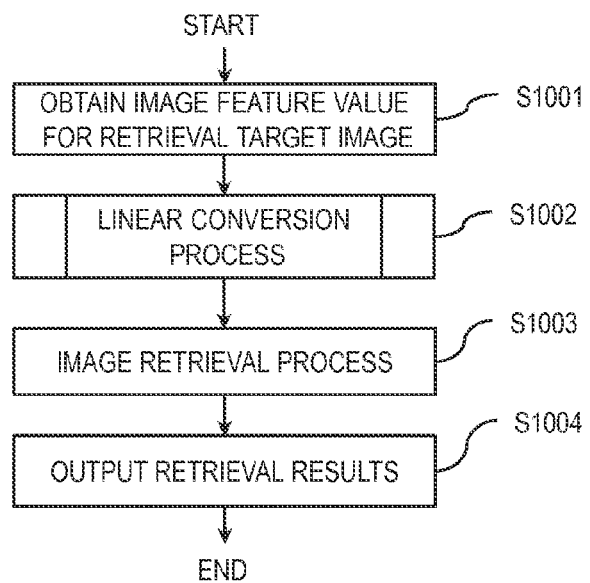
FIG. 10 is a flowchart showing a processing procedure example of an image retrieval process executed by the image retrieval apparatus of Embodiment 1.

FIG. 10 is a flowchart showing a processing procedure example of an image retrieval process executed by the image retrieval apparatus 300 of Embodiment 1. The image retrieval apparatus 300 first causes the acquisition unit 801 to obtain image feature values for the retrieval target image (Step S1001), and then conducts a linear conversion process (Step S1002). The linear conversion process (Step S1002) will be explained in detail in FIG. 11. By the linear conversion process (Step S1002), the first and second conversion results are provided from the conversion unit 805.

After the linear conversion process (Step S1002), the image retrieval apparatus 300 causes the image retrieval unit 806 to conduct an image retrieval process (Step S1003), and causes the output unit 807 to output the retrieval results (Step S1004), which concludes the image retrieval process.

Figure 11:
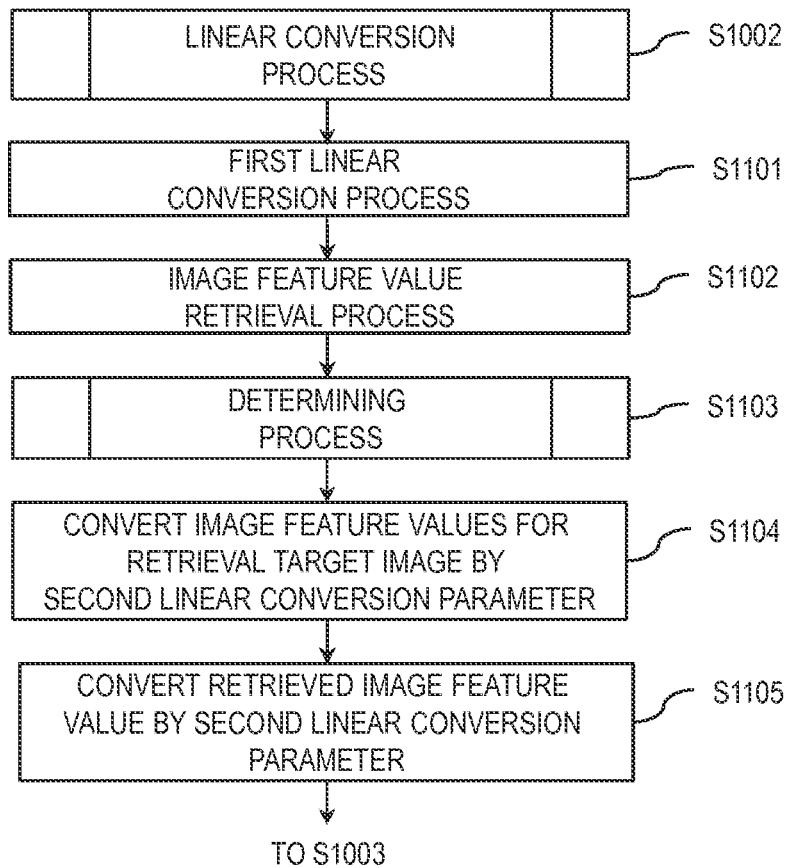
FIG. 11 is a flowchart showing a detailed processing procedure example of the linear conversion process (Step S1002) shown in FIG. 10.

FIG. 11 is a flowchart showing a detailed processing procedure example of the linear conversion process (Step S1002) shown in FIG. 10. First, the image retrieval apparatus 300 causes the generation unit 802 to convert the image feature values for the retrieval target image using the first linear conversion parameter, thereby generating image feature values that were subjected to linear conversion (Step S1101).

Next, the image retrieval apparatus 300 conducts an image feature value retrieval process (Step S1102) to retrieve a representative image feature value that is similar to the image feature values obtained in Step S1101. Thereafter, the image retrieval apparatus 300 causes the determining unit 804 to conduct the determining process (Step S1103). The determining process (Step S1103) will be explained in detail later.

After Step S1103, the image retrieval apparatus 300 causes the conversion unit 805 to conduct linear conversion on the image feature values generated in Step S1101, using the second linear conversion parameter (Step S1104). The first conversion result is obtained as a result of this linear conversion. The image retrieval apparatus 300 causes the conversion unit 805 to conduct, using the second linear conversion parameter, linear conversion on the respective image feature values in the cluster that is identified by the representative feature value, which has been retrieved in Step S1102 (Step S1105). This linear conversion provides the second conversion results. Thereafter, the process moves to Step S1003 of FIG. 10.

Figure 12:
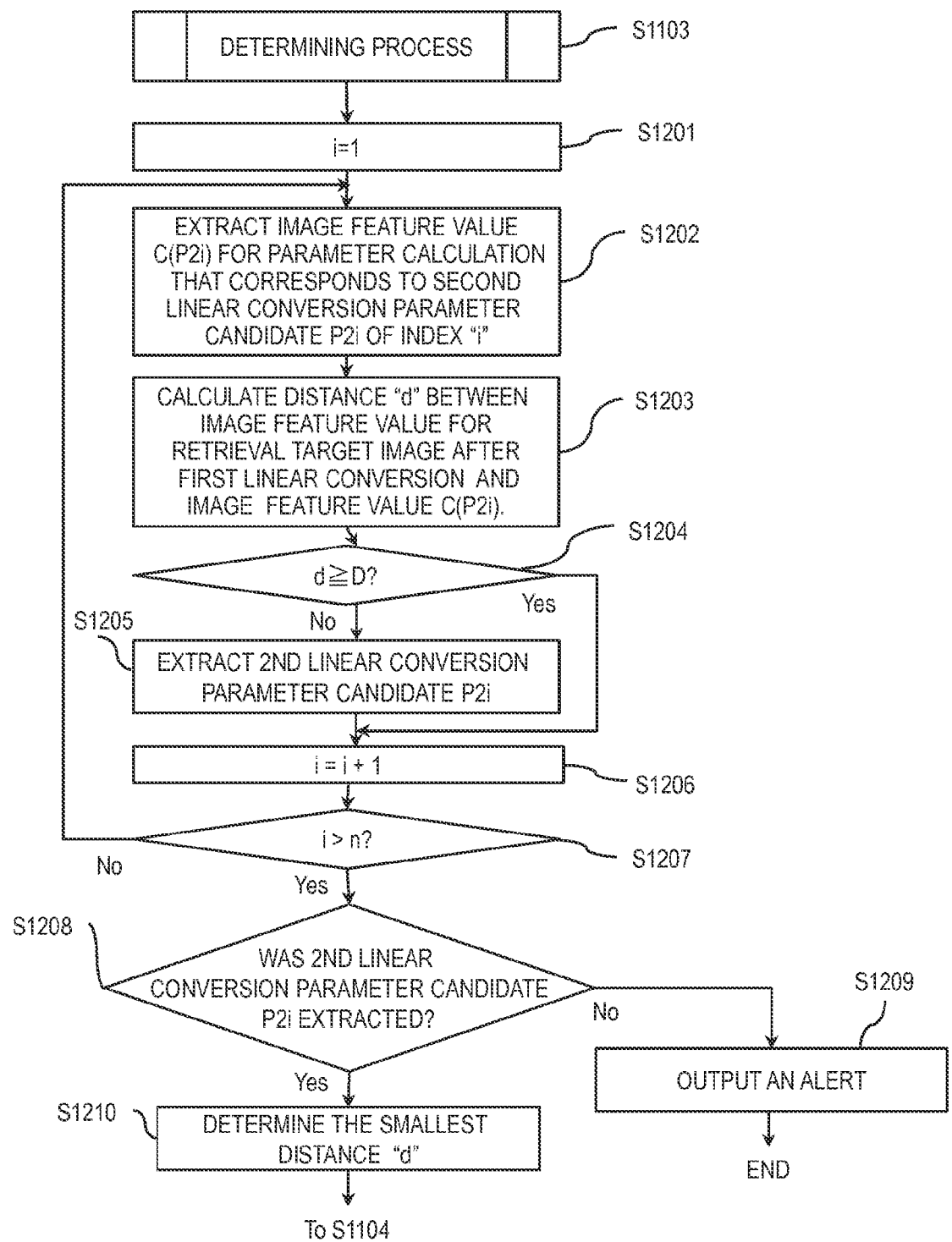
FIG. 12 is a flowchart showing a detailed processing procedure example of the determining process (Step S1103) shown in FIG. 11.

FIG. 12 is a flowchart showing a detailed processing procedure example of the determining process (Step S1103) shown in FIG. 11. In this example, the second linear conversion parameter candidate is denoted by P2$i$, and the image feature value for parameter calculation is denoted by C(P2$i$). "i" is an index ("i" is an integer of 1 or greater).

First, the image retrieval apparatus 300 defines the index "i" of the second linear conversion parameter candidate as 1 (Step S1201), and extracts the image feature value C(P2$i$) for parameter calculation that corresponds to the second linear conversion parameter candidate P2$i$ from the second linear conversion parameter dictionary 700 (Step S1202). Next, the image retrieval apparatus 300 calculates the distance "d" between the image feature value for the retrieval target image that underwent the first linear conversion and the image feature value C(P2$i$) (Step S1203). The image retrieval apparatus 300 determines whether the calculated distance "d" is at least equal to a threshold value D or not (Step S1204). If the distance "d" is not equal to or greater than the threshold value D (Step S1204: No), the image retrieval apparatus 300 extracts the second linear conversion parameter candidate P2$i$ that corresponds to the image feature value C(P2$i$) from the second linear conversion parameter dictionary 700 (Step S1205), and then moves to Step S1206.

On the other hand, if the distance "d" is equal to or greater than the threshold value D (Step S1204: Yes), the process moves to Step S1206 without extracting the second linear conversion parameter candidate P2$i$ that corresponds to the image feature value C(P2$i$) from the second linear conversion parameter dictionary 700. In Step S1206, the image retrieval apparatus 300 increments the index "i" (Step S1206), and determines whether the incremented index "i" is greater than "n" or not (Step S1207). "n" is a total number of the second linear conversion parameter candidates. If the index "i" is equal to or less than "n" (Step S1207: No), the process returns to Step S1202.

On the other hand, if the index "i" is greater than "n" (Step S1207: Yes), the image retrieval apparatus 300 determines whether the second linear conversion parameter candidates were extracted in Step S1205 or not (Step S1208). If the second linear conversion parameter candidates were not extracted (Step S1208: No), the image retrieval apparatus 300 outputs an alert via the output unit 807 (Step S1209). If the second linear conversion parameter candidates have been extracted (Step S1208: Yes), the image retrieval apparatus 300 defines, as the second linear conversion parameter, the second linear conversion parameter candidate P2$i$ having the smallest distance "d" among the extracted candidates (Step S1210). Then, the process moves to Step S1104.

As described above, according to Embodiment 1, by creating a database of second linear conversion parameter candidates for each localized image group having image feature values that vary in an isotropic manner, the image feature values can be converted by linear conversion instead of non-linear conversion. This makes it possible to speed up the process to convert the image feature values while maintaining substantially the same conversion accuracy as that of the non-linear conversion.

Also, using the cluster database 500 allows the image retrieval apparatus 300 to narrow down the retrieval target to a group of representative feature values, and therefore, to complete the retrieval process faster. Furthermore, conducting the first linear conversion on the retrieval target image in advance allows the image retrieval apparatus 300 to compress the image feature values for the retrieval target image, thereby reducing the time required for the retrieval process by the image feature value retrieval unit 803.

Embodiment 2

Next, Embodiment 2 will be explained. In Embodiment 1, the image feature values for the retrieval target image that are used in the second linear conversion by the conversion unit 805 have not undergone the linear conversion that uses the first linear conversion parameter. In Embodiment 2, however, image feature values that underwent the linear conversion using the first linear conversion parameter are used for the image feature values of the retrieval target image in the second linear conversion conducted by the conversion unit 805. Because the image feature values after the first linear conversion have fewer dimensions than the pre-conversion image feature values, the second linear conversion can be completed faster than that of Embodiment 1.
<Image Feature Value Database>

Figure 13:
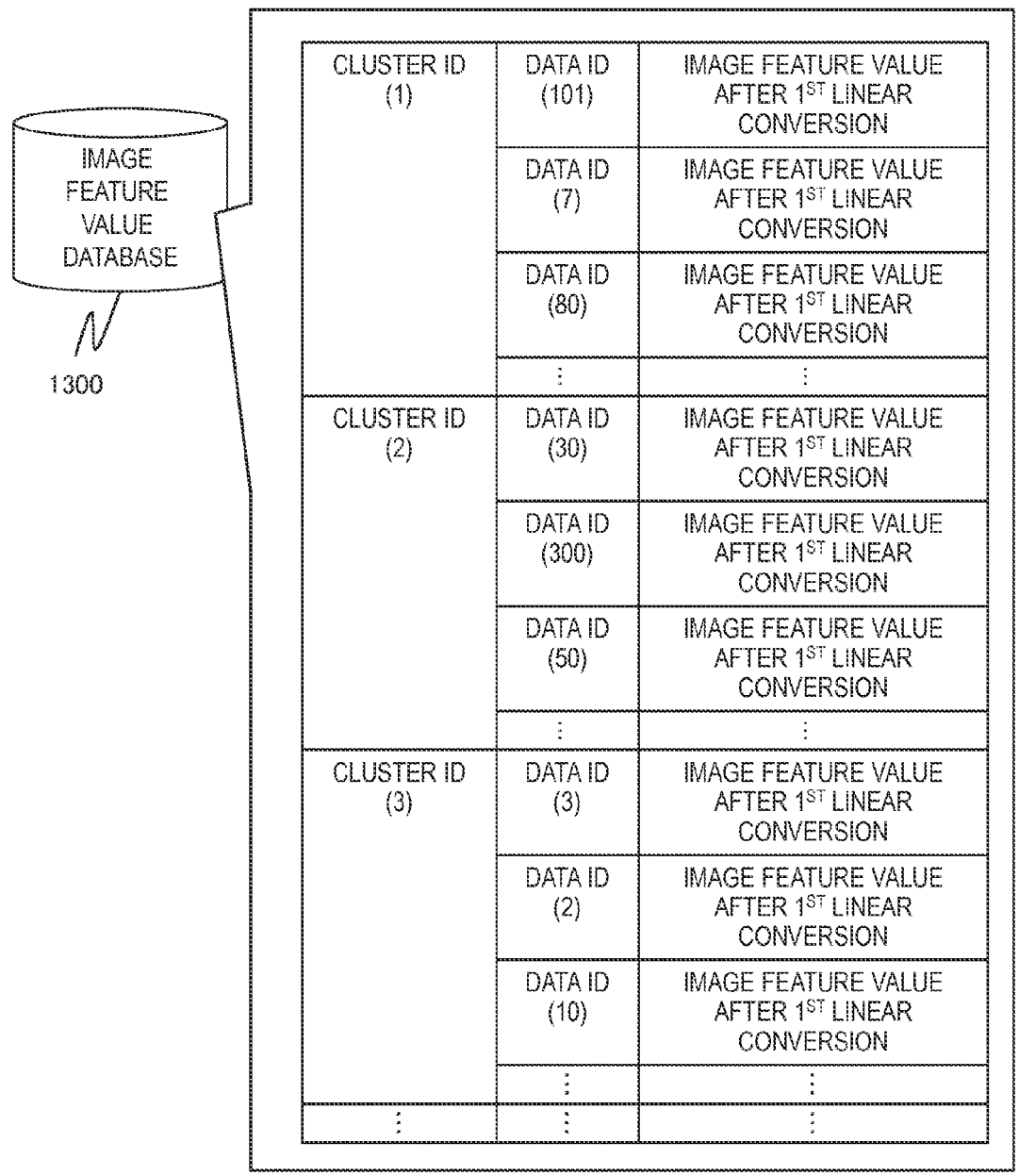
FIG. 13 is a diagram for explaining the content stored in an image feature value database of Embodiment 2.

FIG. 13 is a diagram for explaining the content stored in an image feature value database 1300 of Embodiment 2. This database differs from the image feature value database 400 of Embodiment 1 in that the image feature values associated with the data IDs underwent the first linear conversion. In Embodiment 2, because the image feature values for the retrieval target image that are given to the conversion unit 805 are image feature values that underwent the first linear conversion, the image feature values in the image feature value database 1300 that are to be searched are also converted using the first linear conversion parameter.
<Functional Configuration Example of Image Retrieval Apparatus 300>

Figure 14:
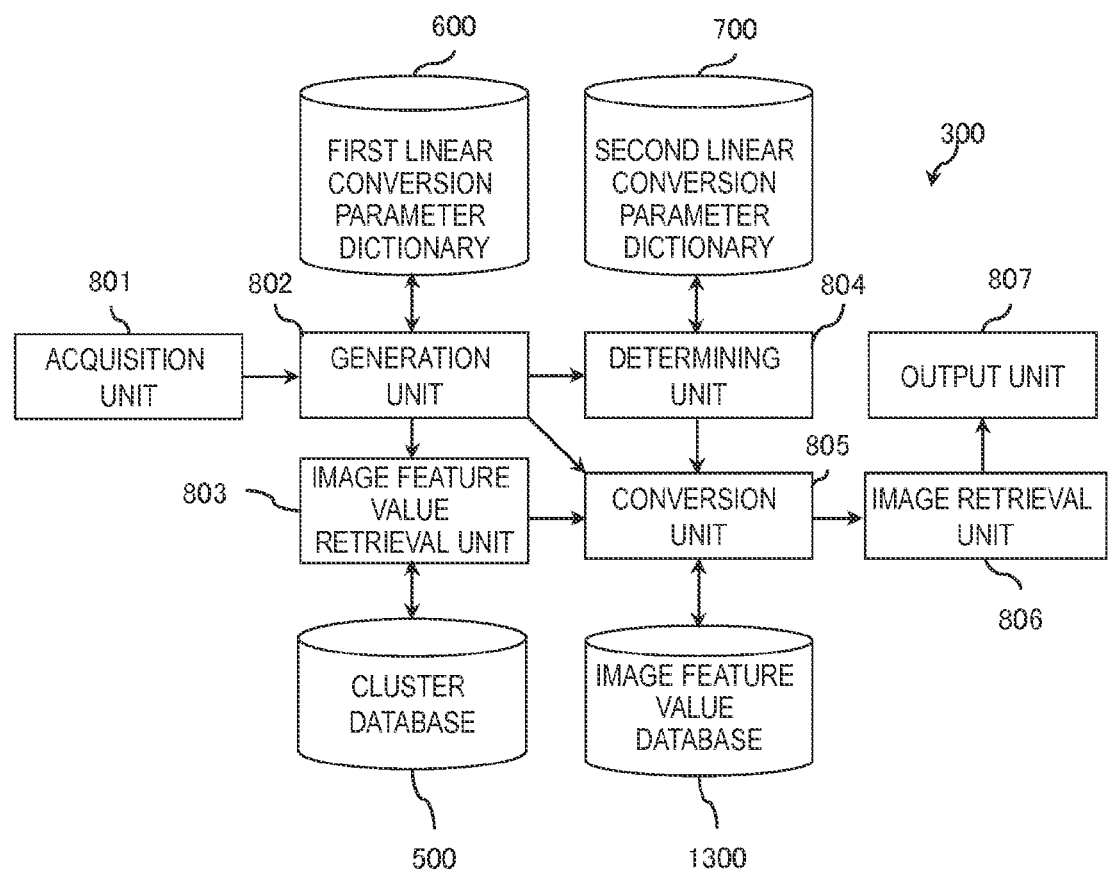
FIG. 14 is a block diagram showing a functional configuration example of the image retrieval apparatus of Embodiment 2.

FIG. 14 is a block diagram showing a functional configuration example of the image retrieval apparatus 300 of Embodiment 2. The same configurations as those of Embodiment 1 are given the same reference characters, and the descriptions thereof will be omitted. In the image retrieval apparatus 300 of Embodiment 2, the image feature values for the retrieval target image that are given to the conversion unit 805 are image feature values that underwent the first linear conversion. Therefore, the conversion unit 805 receives the image feature values for the retrieval target image that underwent the first linear conversion by the generation unit 802, instead of the image feature values for the retrieval target image acquired by the acquisition unit 801. The conversion unit 805 refers to the image feature value database 1300 of FIG. 13 instead of the image feature database 400 of FIG. 4.
<Image Retrieval Processing Procedure>

Next, an example of the image retrieval process by the image retrieval apparatus 300 of Embodiment 2 will be explained. Because the image retrieval process is the same as that shown in FIG. 10, the descriptions thereof are omitted.

Figure 15:
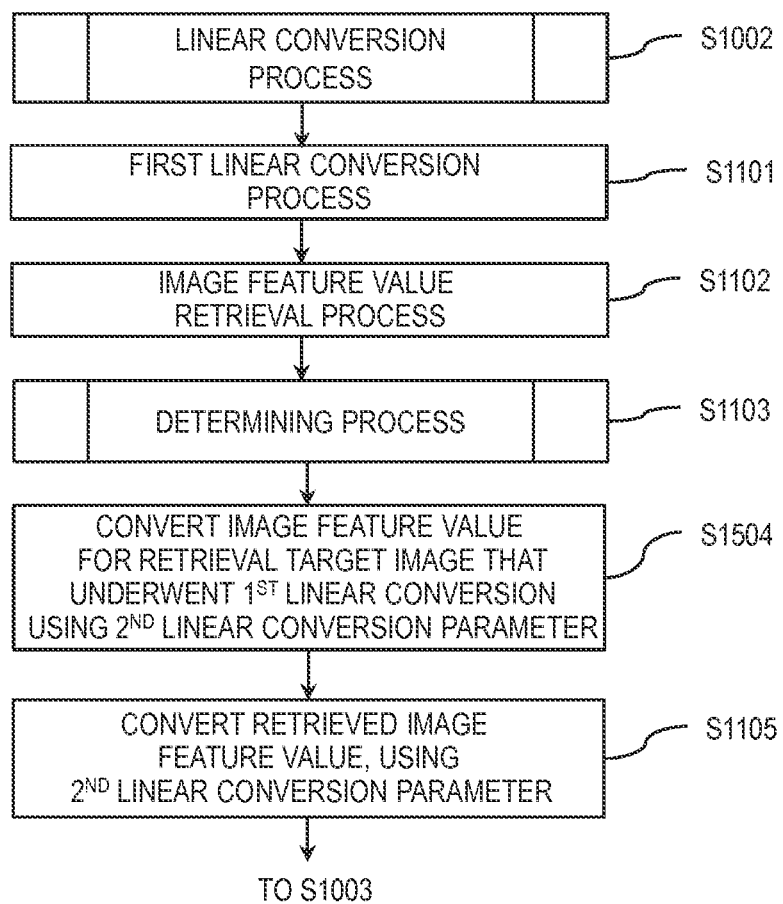
FIG. 15 is a flowchart showing a detailed processing procedure example of the linear conversion process (Step S1002) of Embodiment 2.

FIG. 15 is a flowchart showing a detailed processing procedure example of the linear conversion process (Step S1002) of Embodiment 2. The same steps as those in Embodiment 1 are given the same step numbers, and the descriptions thereof will be omitted.

In FIG. 15, after the determining process (Step S1103), the image retrieval apparatus 300 converts the image feature values for the retrieval target image that underwent the first linear conversion (S1504) using the second linear conversion parameter that was obtained through the determining process (Step S1103). The resultant image feature values are the first conversion results.

As described above, in Embodiment 2, the image feature value that underwent linear conversion by the first linear conversion parameter is used for the image feature value for the retrieval target image in the second linear conversion by the conversion unit 805. Because the image feature value after the first linear conversion has fewer dimensions than the original image feature value, the second linear conversion can be completed faster than Embodiment 1.

Embodiment 3

Next, Embodiment 3 will be explained. Embodiment 3 differs from Embodiments 1 and 2 in that the cluster database 500 and image feature value database 400, 1300 are updated. The components that are the same as those in Embodiments 1 and 2 are given the same reference characters, and the descriptions thereof will be omitted.
<Functional Configuration Example of Image Retrieval Apparatus 300>

Figure 16:
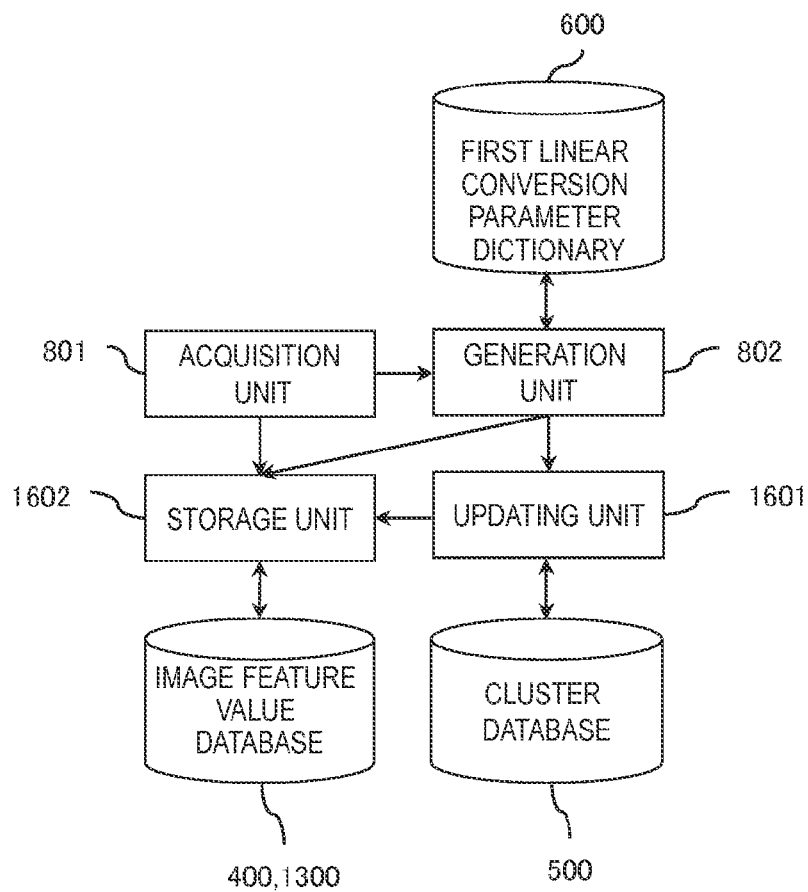
FIG. 16 is a block diagram showing a functional configuration example of the image retrieval apparatus of Embodiment 3.

FIG. 16 is a block diagram showing a functional configuration example of the image retrieval apparatus 300 of Embodiment 3. The image retrieval apparatus 300 includes a first linear conversion parameter dictionary 600, a cluster database 500, an image feature value database 400, 1300, an acquisition unit 801, a generation unit 802, an updating unit 1601, and a storage unit 1602. Specifically, the functions of the updating unit 1601 and storage unit 1602 are realized by having the processor 301 shown in FIG. 3 execute programs, for example.

The acquisition unit 801 obtains image feature values for an image that is to be registered (registration subject image). The method to obtain the image feature values is similar to the method to obtain image feature values for the retrieval target image described above. The generation unit 802 conducts linear conversion on the image feature values for the registration subject image using the first linear conversion parameter, thereby generating image feature values that went through the first linear conversion. The method to generate the image feature values is similar to the method to generate image feature values for the retrieval target image described above.

The updating unit 1601 updates images that belong to a cluster including the image to be registered, and updates the representative feature values of the cluster database 500.

In Embodiment 1, the storage unit 1602 registers, in the image feature value database 1300, the image feature values for the registration subject image before the first linear conversion, which have been acquired from the acquisition unit 801. On the contrary, in Embodiment 2, the storage unit 1602 registers, in the image feature value database 1300, the image feature values for the registration subject image that underwent the first linear conversion, which have been obtained from the generation unit 802.
<Example of Image Feature Value Update Process Steps>

Figure 17:
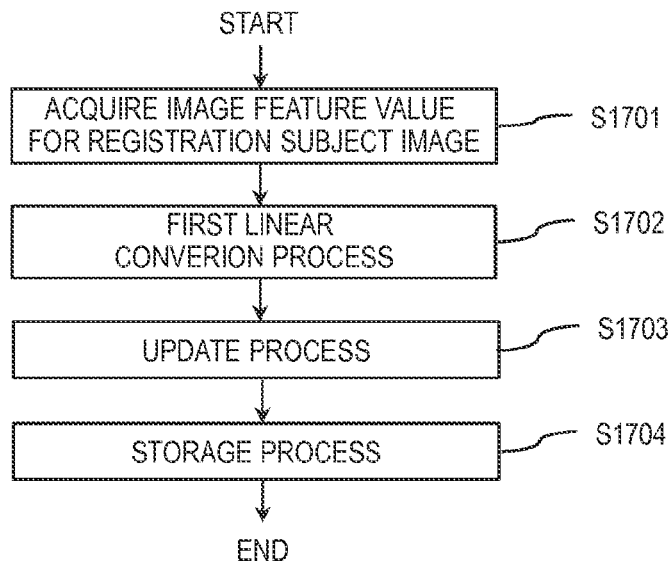
FIG. 17 is a flowchart showing a processing procedure example of update process for image feature values in Embodiment 3.

FIG. 17 is a flowchart showing a processing procedure example of update process for image feature values in Embodiment 3. First, the image retrieval apparatus 300 causes the acquisition unit 801 to obtain image feature values for a registration subject image (Step S1701). Next, the image retrieval apparatus 300 conducts the first linear conversion process on the obtained image feature values (Step S1702). Then, the image retrieval apparatus 300 causes the updating unit 1601 to conduct the update process described above (Step S1703), and causes the storage unit 1602 to conduct the storage process described above (Step S1704).

As described above, when a registration subject image is provided, the updating unit 1601 and the storage unit 1602 keep up-to-date the cluster database 500 and the image feature value database 400, 1300, which improves the reliability of the linear conversion.

Embodiment 4

Next, Embodiment 4 will be explained. Embodiment 4 shows an example in which the image retrieval apparatus 300 of Embodiments 1 and 2 is applied to a network system.

Figure 18:
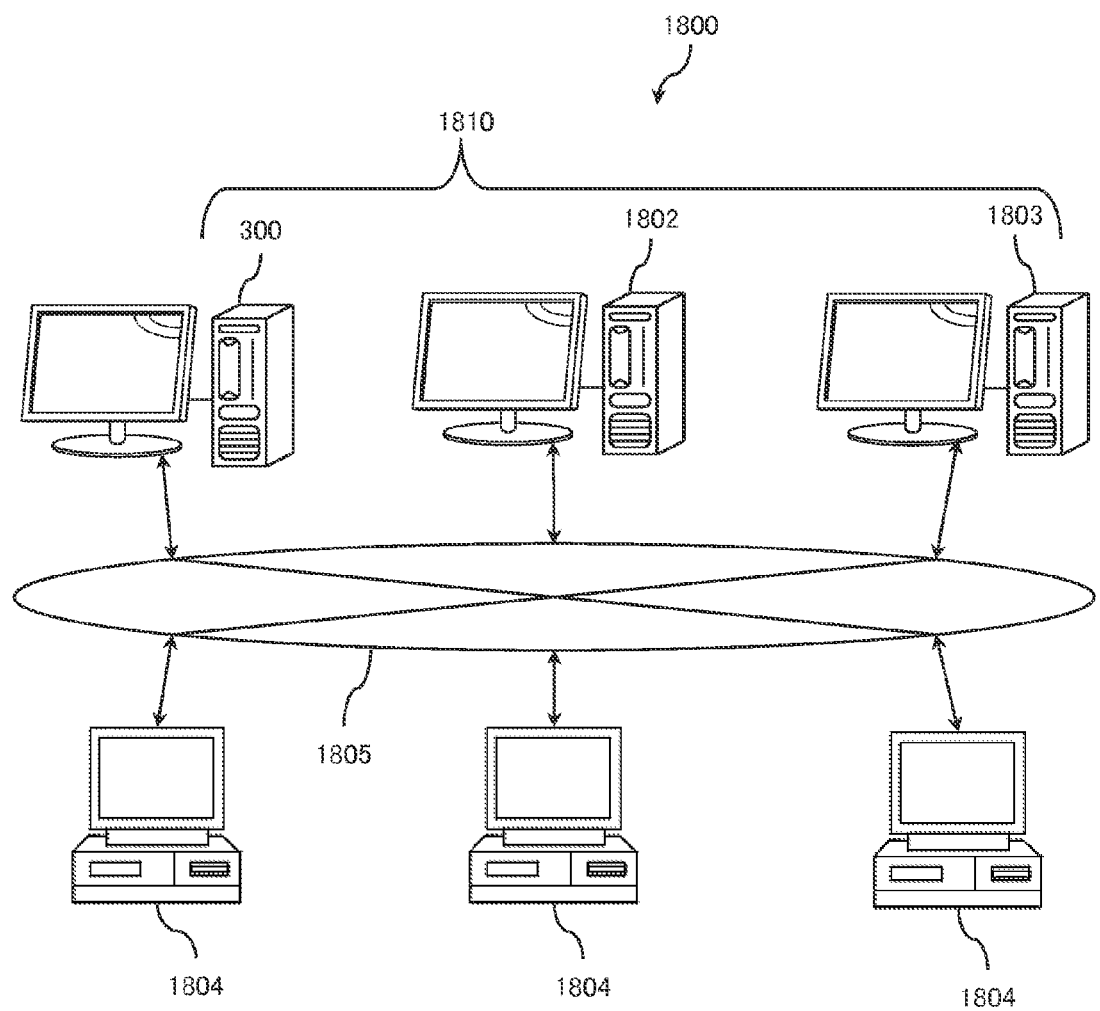
FIG. 18 is a diagram for explaining a configuration example of the network system of Embodiment 4.

FIG. 18 is a diagram for explaining a configuration example of the network system of Embodiment 4. In the network system 1800, the image retrieval apparatus 300, a retrieval apparatus 1802, a memory apparatus 1803, and terminals 1804 are connected to each other via network 1805 such as LAN (Local Area Network), WAN (Wide Area Network), or Internet in such a manner that the respective apparatuses and terminals can communicate with each other. In the network system 1800, cloud 1910 is realized with the image retrieval apparatus 300, retrieval apparatus 1802, and memory apparatus 1803.

The image retrieval apparatus 300 of Embodiments 1 and 2 conducted the image retrieval using the image feature values that underwent the second linear conversion, but in Embodiment 4, the image retrieval apparatus 300 does not conduct image retrieval using the image feature values that underwent the second linear conversion. The retrieval apparatus 1802, which includes the image retrieval unit 806, conducts the image retrieval using the image feature values that underwent the second linear conversion. The memory apparatus 1803 stores the cluster database 500 and the image feature value database 400, 1300. The memory apparatus 1803 also stores therein images that are specified by data IDs. The terminals 1804 each send a retrieval target image to the cloud 1910, and then receive images that are similar to the retrieval target image from the cloud 1910. The terminals 1804 may also send image feature values for the retrieval target image to the cloud 1910.

Figure 19:
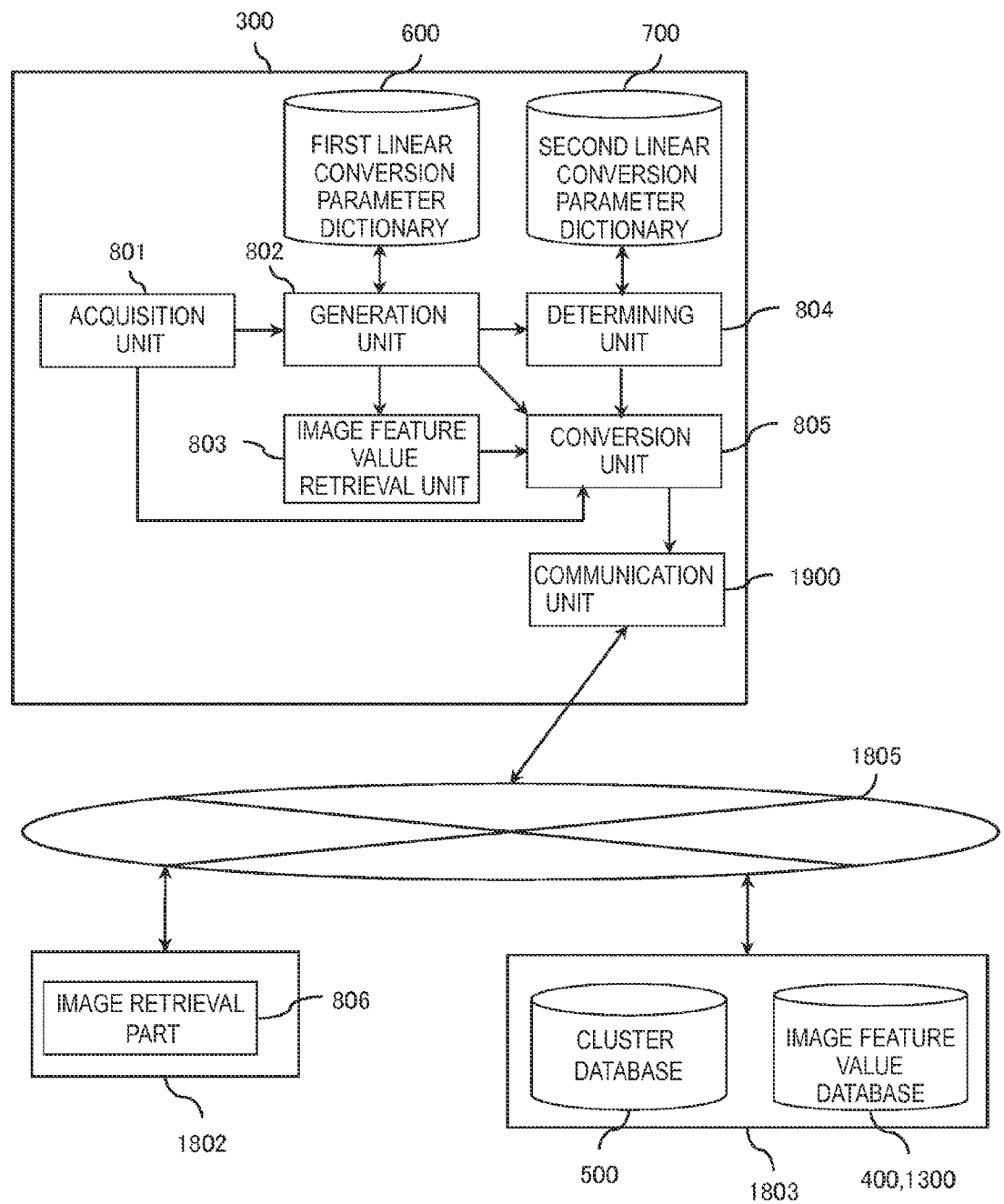
FIG. 19 is a block diagram showing a functional configuration example of the network system of Embodiment 4.

FIG. 19 is a block diagram showing a functional configuration example of the network system 1800 of Embodiment 4. The image retrieval apparatus 300 of the present invention has a communication unit 1900 instead of the image retrieval unit 806 and output unit 807 that were included in the functional configuration of Embodiments 1 and 2. The communication unit 1900 sends the image feature values that underwent the second linear conversion by the conversion unit 805 to the retrieval apparatus 1802. The image retrieval apparatus 300 also gets access to the cluster database 500 and the image feature value database 400, 1300 in the memory apparatus 1803, and conducts processes similar to those in Embodiments 1 and 2. The retrieval results of the image retrieval unit 806 may be sent to the terminal 1804, from which the retrieval target image was sent, via the retrieval apparatus 1802, or alternatively, via the image retrieval apparatus 300 that has received the retrieval results from the retrieval apparatus 1802.

<Image Retrieval Processing Procedure>

Figure 20:
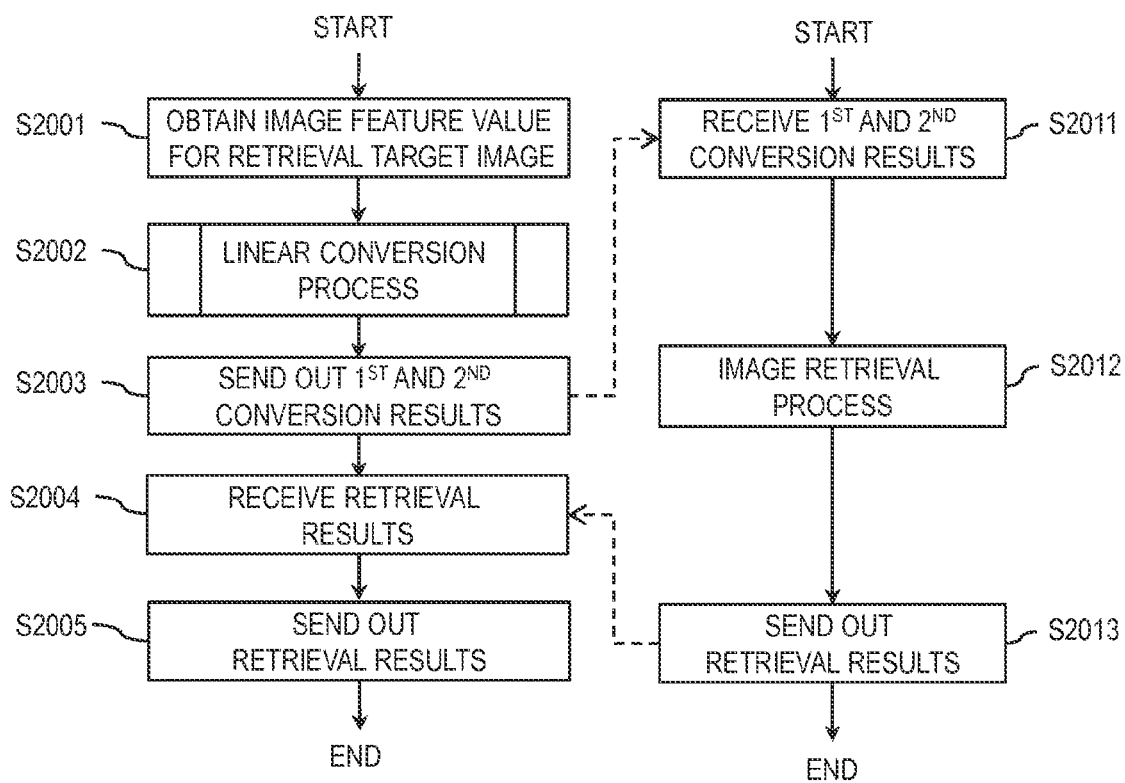
FIG. 20 is a flowchart showing an example of image retrieval processing procedure by the cloud.

FIG. 20 is a flowchart showing an example of image retrieval processing procedure by the cloud 1910. In FIG. 20, the flowchart on the left side is for the image retrieval apparatus 300, and the flowchart on the right side is for the retrieval apparatus 1802. First, the flow of the image retrieval apparatus 300 will be explained.

The image retrieval apparatus 300 causes the acquisition unit 801 to obtain image feature values for the retrieval target image from a terminal 1804 (Step S2001), and conducts a linear conversion process on the image feature values (Step S2002). The linear conversion process (Step S2002) is the same as the linear conversion process (Step S1002) described above.

After the linear conversion process (Step S2002), the image retrieval apparatus 300 sends the first and second conversion results of the linear conversion process (Step S2002) to the retrieval apparatus 1802 (Step S2003). Then, after receiving retrieval results from the retrieval apparatus 1802, the image retrieval apparatus 300 forwards the retrieval results to the terminal 1804 from which the retrieval target image has been sent (Step S2005).

Next, the flow of the retrieval apparatus 1802 will be explained. When the retrieval apparatus 1802 receives the first and second conversion results (Step S2003) from the image retrieval apparatus 300 (Step S2011), the image retrieval unit 806 conducts an image retrieval process (Step S2012). Then, the retrieval apparatus 1802 sends the retrieval results to the image retrieval apparatus 300 (Step S2013). This concludes a series of steps of the image retrieval process by the cloud 1910.

As described above, the image retrieval apparatus 300 and the network system 1800 compile a database of linear conversion parameters based on image feature values that vary in the same direction and select a linear conversion parameter that is most suited to the retrieval target image among the group of linear conversion parameters. This enables the image retrieval apparatus 300 to employ linear conversion and reduce the time required for the conversion process of the image feature values while maintaining substantially the same conversion accuracy as that of the non-linear conversion.

It should be noted that this invention is not limited to the above-mentioned embodiments, and encompasses various modification examples and the equivalent configurations within the scope of the appended claims without departing from the gist of this invention. For example, the above-mentioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. An image retrieval apparatus, comprising:
a memory unit configured to store therein a plurality of image feature values;
an acquisition unit configured to acquire a first image feature value for a retrieval target image;
a retrieval unit configured to retrieve an image feature value that is similar to the first image feature value from the plurality of image feature values stored in the memory unit, based on the first image feature value acquired by the acquisition unit;
a determining unit configured to determine a linear conversion parameter, to be used for linear conversion out of a group of linear conversion parameters that are based on a plurality of image feature values for a plurality of images of the same photographic subject obtained under a plurality of conditions, based on the first image feature value and image feature values for said photographic subject;
a conversion unit configured to convert the first image feature value by the linear conversion parameter determined by the determining unit, the conversion unit converting the image feature value retrieved by the retrieval unit using said linear conversion parameter; and
an output unit configured to output conversion results of the conversion unit;
wherein the plurality of image feature values are representative image feature values of respective groups of image feature values, each of the respective groups having image feature values that are similar to each other; and
wherein the conversion unit configured to convert the first image feature value by the linear conversion parameter, and to convert, by said linear conversion parameter, respective image features of a group that is represented by a representative image feature value retrieved by the retrieval unit.

2. The image retrieval apparatus according to claim 1, wherein the determining unit configured to determine whether there is a linear conversion parameter to be used by the conversion unit or not based on the first image feature value and image feature values for the photographic subject, and to output the linear conversion parameter to the conversion unit if the linear conversion parameter exists, and outputs information that indicates absence of the linear conversion parameter if the linear conversion parameter does not exist.

3. The image retrieval apparatus according to claim 1 further comprising a generation unit configured to convert, using another linear conversion parameter that differs from said linear conversion parameter, the first image feature value acquired by the acquisition unit, thereby generating a second image feature value for the retrieval target image,
wherein each of the plurality of image feature values is an image feature value that converted by said another linear conversion parameter,
wherein the retrieval unit configured to retrieve an image feature value that is similar to the second image feature value generated by the generation unit from the plurality of image feature values,
wherein the determining unit configured to determine the linear conversion parameter out of a group of linear conversion parameter, based on the second image feature value and image feature values for the photographic subject, and
wherein the conversion unit configured to convert the second image feature value by the linear conversion parameter, and to convert the image feature value retrieved by the retrieval unit using the linear conversion parameter.

4. The image retrieval apparatus according to claim 1 further comprising an image retrieval unit configured to retrieve an image similar to the retrieval target image from a group of images from which the respective image feature values were extracted, based on a first conversion result obtained by the conversion unit converting the first image feature value, and a second conversion result obtained by the conversion unit converting the image feature value retrieved by the retrieval unit,
wherein the output unit configured to output the image retrieved by the image retrieval unit.

5. An image retrieval apparatus, comprising:
a memory unit configured to store therein a plurality of image feature values;
an acquisition unit configured to acquire a first image feature value for a retrieval target image;
a retrieval unit configured to retrieve an image feature value that is similar to the first image feature value from the plurality of image feature values stored in the memory unit, based on the first image feature value acquired by the acquisition unit;
a determining unit configured to determine a linear conversion parameter, to be used for linear conversion out of a group of linear conversion parameters that are based on a plurality of image feature values for a plurality of images of the same photographic subject obtained under a plurality of conditions, based on the first image feature value and image feature values for said photographic subject;
a conversion unit configured to convert the first image feature value by the linear conversion parameter determined by the determining unit, the conversion unit converting the image feature value retrieved by the retrieval unit using said linear conversion parameter;
an output unit configured to output conversion results of the conversion unit; and
a generation unit configured to convert, using another linear conversion parameter that differs from said linear conversion parameter, the first image feature value acquired by the acquisition unit, thereby generating a second image feature value for the retrieval target image,
wherein the retrieval unit configured to retrieve an image feature value that is similar to the second image feature value generated by the generation unit among the plurality of image feature values, and
wherein the determining unit configured to determine a linear conversion parameter to be used for linear conversion among a group of linear conversion parameters, based on the second image feature value and image feature values for the photographic subject.

6. An image retrieval method, comprising:

acquiring a first image feature value for a retrieval target image;

retrieving, from a plurality of image feature values, an image feature value that is similar to the first image feature value acquired in the acquiring;

determining a linear conversion parameter, to be used for linear conversion out of a group of linear conversion parameters that are based on a plurality of image feature values for a plurality of images of the same photographic subject obtained under a plurality of conditions, based on the first image feature value and image feature value for the photographic subject;

converting the first image feature value using a linear conversion parameter determined in the determining, and converting, using the linear conversion parameter, the image feature value retrieved in the retrieving; and outputting the conversion result of the converting;

wherein the plurality of image feature values are representative image feature values of respective groups of image feature values, each of the respective groups having image feature values that are similar to each other; and wherein the converted first image feature value and the converted respective image features of a group are represented by a retrieved representative image feature value.

* * * * *